(12) United States Patent
Komukai et al.

(10) Patent No.: US 12,134,856 B2
(45) Date of Patent: Nov. 5, 2024

(54) METHOD FOR PRODUCING COMPOSITE MATERIAL (71) Applicant: NITTA Corporation, Osaka (JP)

(72) Inventors: Takuji Komukai, Osaka (JP); Maki Onizuka, Osaka (JP); Hiromi Teruhira, Osaka (JP); Katsuyuki Nakai, Osaka (JP)

(73) Assignee: NITTA CORPORATION, Osaka (JP)

( * ) Notice: Subject to any disclaimer, the term of this patent is extended or adjusted under 35 U.S.C. 154(b) by 0 days.

(21) Appl. No.: 18/312,053

(22) Filed: May 4, 2023

(65) Prior Publication Data

US 2023/0304215 A1   Sep. 28, 2023

Related U.S. Application Data

(63) Continuation of application No. 15/520,565, filed as application No. PCT/JP2015/079333 on Oct. 16, 2015, now abandoned.

(51) Int. Cl.
| | |
|---|---|
| *D06M 11/74* | (2006.01) |
| *C01B 32/158* | (2017.01) |
| *C08J 5/04* | (2006.01) |
| *C08J 5/06* | (2006.01) |
| *D06M 15/55* | (2006.01) |
| *B05D 1/18* | (2006.01) |
| *D06M 101/40* | (2006.01) |

(52) U.S. Cl.
CPC ........... *D06M 11/74* (2013.01); *C01B 32/158* (2017.08); *C08J 5/042* (2013.01); *C08J 5/06* (2013.01); *D06M 15/55* (2013.01); *B05D 1/18* (2013.01); *C01B 2202/06* (2013.01); *C01B 2202/34* (2013.01); *C01B 2202/36* (2013.01); *C08J 2363/00* (2013.01); *C08J 2377/02* (2013.01); *D06M 2101/40* (2013.01)

(58) Field of Classification Search
CPC ........................................................ B05D 1/18
See application file for complete search history.

(56) References Cited

U.S. PATENT DOCUMENTS

2007/0189953 A1  8/2007  Bai et al.
2014/0151111 A1  6/2014  Shah et al.

FOREIGN PATENT DOCUMENTS

| EP | 3279255 | 2/2018 |
|---|---|---|
| EP | 3279394 | 2/2018 |
| JP | 2007126311 | 5/2007 |
| JP | 2009535530 | 10/2009 |
| JP | 2010059561 | 3/2010 |
| JP | 2010531934 | 9/2010 |
| JP | 2013076198 | 4/2013 |

(Continued)

OTHER PUBLICATIONS

Extended European Search Report dated May 15, 2018 for Application No. 15852316.7-1107/2311131 PCT/JP2015079333 (7 pages).

(Continued)

*Primary Examiner* — Ian A Rummel
(74) *Attorney, Agent, or Firm* — Fox Rothschild LLP; Carol Thorstad-Forsyth (57) ABSTRACT

Provided are a composite material and a reinforced fiber. The composite material includes a fiber and a plurality of carbon nanotubes disposed on a surface of the fiber. The carbon nanotubes adhere directly to the surface of the fiber.

1 Claim, 7 Drawing Sheets

(56) References Cited

FOREIGN PATENT DOCUMENTS

WO      2014175319      10/2014

OTHER PUBLICATIONS

International Search Report mailed Jan. 12, 2016 for International PCT Patent Application No. PCT/JP2015/079333 (5 pages).
Machine English Translation: Yoshiki et al., JP 2003-239171, "Carbon fiber, method for producing the same and carbon fiber-reinforced resin composition", Aug. 27, 2003.

METHOD FOR PRODUCING COMPOSITE MATERIAL

CROSS REFERENCE TO RELATED APPLICATION

The present application is a continuation of U.S. patent application Ser. No. 15/520,565, filed Apr. 20, 2017, which is a U.S. National Phase Application of PCT International Application No. PCT/JP2015/079333, filed Oct. 16, 2015, which claims the benefit of priority to Japanese Patent Application No. 2014-216037, filed Oct. 23, 2014, the entire contents of which are herein incorporated by reference.

TECHNICAL FIELD

The present invention relates to a composite material including a fiber with carbon nanotubes (hereinafter referred to as "CNTs") adhered to a surface of the fiber, and to a reinforced fiber including the composite material.

BACKGROUND ART

It is desirable that CNTs uniformly adhere to the surface of a fiber to allow the above-described composite material to exhibit its functions.

Such a composite material is produced as follows: a fiber is immersed in a solution (which may be referred to as CNT nano dispersion in the following description), in which CNTs are dispersed at a nano level; after the CNTs adhered to the surface of the fiber, the fiber is taken out of the CNT nano dispersion and dried.

Van der Waals force causes irreversible aggregation of the CNTs in the CNT nano dispersion. To allow the CNTs to adhere uniformly to the surface of the fiber, it has been necessary to add a large amount of dispersing agent to the CNT nano dispersion to prevent the aggregation of the CNTs and disperse the CNTs.

Ultrasonic irradiation or stirring may be performed in an auxiliary manner (see Patent Literature 1) to disperse the CNTs in the CNT nano dispersion. The dispersing agent has been required to disperse the CNTs. Generally, the dispersing agent has been regarded as indispensable for the production process of the composite material.

In addition to the dispersing agent, an adhesive and other additives are added to the CNT nano dispersion to bond the CNTs to the surface of the fiber.

Owing to the CNTs adhered to the surface, the thus-produced composite material is expected to exhibit not only intrinsic functions of fiber but also improvements in electrical conductivity, thermal conductivity, mechanical strength, and the like, which are derived from the CNTs.

CITATION LIST

Patent Literature

Patent Literature 1: Japanese Patent Laid-Open Publication No. 2010-59561

SUMMARY OF INVENTION

Technical Problem

Despite the large amount of CNTs adhered to the fiber, electrical conductivity, thermal conductivity, mechanical strength, and the like of the composite material have not achieved levels required for practical use. This is because a dispersing agent, an adhesive, and other additives intervene between the fiber and the CNTs.

An object of the present invention is to provide a composite material and a reinforced fiber which exhibit both of intrinsic functions of a fiber and functions, such as electrical conductivity, thermal conductivity, and mechanical strength, derived from CNTs.

Solution to Problem

A composite material according to the present invention includes a fiber and a plurality of carbon nanotubes disposed on a surface of the fiber. The carbon nanotubes adhere directly to the surface of the fiber.

A reinforced fiber according to the present invention includes the composite material and a resin composition covering a surface of the composite material.

Advantageous Effects of Invention

According to the present invention, the CNTs adhere to the surface of the fiber, without any intervening material between the surface of the fiber and the CNTs. Hence, the CNTs are not likely to peel off from the surface of the composite material. Therefore, the composite material and the reinforced fiber exhibit both of the intrinsic functions of the fiber and the functions, such as electrical conductivity, thermal conductivity, and mechanical strength, derived from CNTs.

BRIEF DESCRIPTION OF DRAWINGS

FIGS. 4A-4D show SEM images of a composite material according to Examples.

FIGS. 6A-6D show SEM images of a composite material with the CNTs entangled with each other to be in direct contact with each other or in direct connection with each other to form a network structure, without any intervening material.

FIGS. 8A-8B show SEM images of the surfaces of samples after evaluation of interfacial properties of composite materials.

DESCRIPTION OF EMBODIMENTS

Hereinafter, the embodiments of the present invention will be described in detail with reference to the drawings.

1. First Embodiment

(1) Configuration

Figure 1:
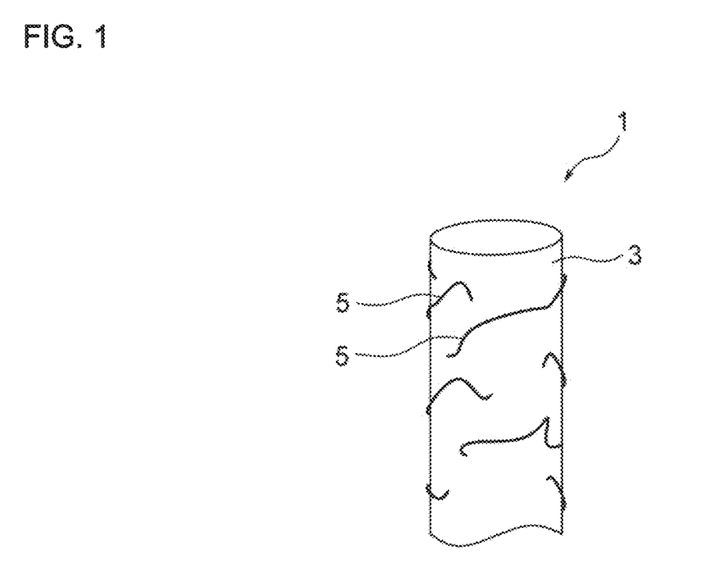
FIG. 1 is a conceptual diagram of a composite material according to a first embodiment.

As shown in FIG. 1, a composite material 1 includes a fiber 3 and CNTs 5 disposed on a surface of the fiber 3.

The material of the fiber 3 is not particularly limited. The fiber 3 may include a carbon material, a resin material, a metallic material, a ceramic material, or the like. In this embodiment, the fiber 3 is a carbon fiber. Note that in the drawing, the fiber 3 is illustrated as a single fiber, but the fiber 3 may be a bundle of fibers. Examples of the fiber 3 include, but are not particularly limited to, a carbon fiber having a diameter of approximately 3 to 150 μm made from polyacrylonitrile, rayon, or pitch, which is produced by heat-treatment of organic fiber derived from petroleum, coal, or coal tar or by heat-treatment of organic fiber derived from wood or plant.

Figure 2:
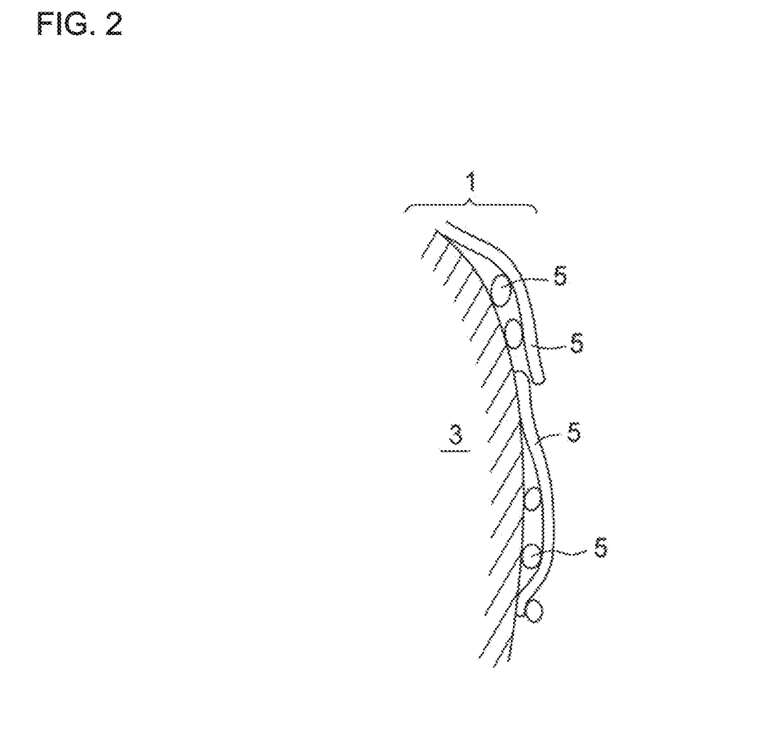
FIG. 2 is a conceptual diagram of the composite material according to the first embodiment.

The CNTs 5 are dispersed on substantially the entire surface of the fiber 3 and adhere directly to the surface of the fiber 3, without any intervening material between the surface of the fiber 3 and the CNTs (FIG. 2). That is, the CNTs 5 adhere directly to the surface of the fiber 3, without a dispersing agent such as a surfactant, an adhesive, or the like between the surface of the fiber 3 and the CNTs. Here, the term adhesion (or adhere to) refers to bonding by Van der Waals force.

The CNTs 5 are locally and unevenly distributed on the surface of the fiber 3. Due to the uneven distribution, the surface of the fiber 3 is partly exposed through the CNTs 5. The term "unevenly distributed" means that the CNTs 5 do not uniformly cover the entire surface of the fiber 3, and does not include evaluation of the dispersibility of the CNTs 5.

It is preferred that the CNTs 5 are entangled with each other, so that the CNTs 5 are directly in contact with each other or directly connected to each other to form a network structure, without the presence of the intervening material. Here, the term "connection (connect, connected)" includes physical connection (mere contact). Further, the terms "direct contact (directly in contact with) and direct connection (directly connected to)" include a state where the CNTs 5 are simply in contact with each other and a state where the CNTs 5 are connected together, without the presence of the intervening material, and are not to be taken in a limited sense.

The length of the CNT 5 is preferably 0.1 to 50 μm. In a case where the length of the CNT 5 is 0.1 μm or more, the CNTs 5 are entangled with each other and directly connected to each other. In a case where the length of the CNT 5 is 50 μm or less, the CNTs are likely to be dispersed uniformly. On the other hand, in a case where the length of the CNT 5 is less than 0.1 μm, the CNTs 5 are not likely to be entangled with each other. In a case where the length of the CNT 5 is more than 50 μm, the CNTs 5 are likely to aggregate.

It is preferred that the average diameter of the CNTs 5 is approximately 30 nm or less. In a case where the CNT 5 has a diameter of 30 nm or less, it is flexible enough to bend (deform) in accordance with the curvature of the surface of the fiber 3. Therefore, the CNTs 5 more securely adhere to the surface of the fiber 3. On the other hand, in a case where the CNT 5 has a diameter of more than 30 nm, the CNT 5 is not flexible and does not bend along the surface of the fiber 3. Therefore, the CNTs 5 are not likely to adhere to the surface of the fiber 3. Note that the diameter of the CNT 5 is defined as an average diameter measured from a transmission electron microscope (TEM) image. It is more preferred that an average diameter of the CNTs 5 is approximately 20 nm or less.

It is preferred that the concentration of the CNTs 5 adhered to the surface of the fiber 3 is in a range of 0.001 to 20 wt % with respect to the fiber 3. When the concentration of the CNTs 5 is in the above range, some portions of the surface of the fiber 3 are not covered with the CNTs 5. The portion of the surface of the fiber 3 not covered with the CNTs 5 is not covered with an adhesive or the like, i.e. the portion of the surface of the fiber 3 is exposed. Hence, the functions of the fiber 3 are not impaired by the CNTs 5. The concentration of the CNTs 5 is more preferably in a range of 0.01 to 10 wt % with respect to the fiber 3.

(2) Production Method

Next, a method for producing the composite material 1 will be described. The composite material 1 is produced by preparing the CNTs 5, then preparing a liquid dispersion containing the CNTs 5, and allowing the CNTs 5 to adhere to the surface of the fiber 3 in the liquid dispersion. Hereinafter, each step will be described in sequence.

(Preparation of CNT)

The CNTs 5 are produced as follows: a catalyst film including aluminum and iron is formed on a silicon substrate by a thermal CVD method described in, for example, Japanese Patent Laid-Open Publication No. 2007-126311; a catalytic metal for growth of the CNTs 5 is atomized into fine particles; and a hydrocarbon gas is brought into contact with the catalytic metal in a heated atmosphere. Thus, the CNTs 5 are produced. It is also possible to use the CNTs 5 produced by another production method such as an arc discharge method or a laser vaporization method. It is preferred to use the CNTs 5 with no or minimum possible amount of impurities. The impurities may be removed by high temperature annealing in an inert gas after the CNTs 5 are produced. The CNT 5 produced in this example has a high aspect ratio of the length in a range of several hundred micrometers (μm) to several millimeters (mm) to the diameter of 30 nm or less, and linearity. The CNT 5 may be a single-walled or multi-walled carbon nanotube, but is preferably a multi-walled carbon nanotube.

(Preparation of Liquid Dispersion)

Next, the liquid dispersion is prepared. In the liquid dispersion, the above-produced CNTs 5 are nano-dispersed. Nano dispersion (or nano-dispersed) refers to a state in which the CNTs 5 dispersed in a solution are physically separated from and not entangled with one another and the proportion of aggregation, in which two or more CNTs 5 aggregate in bundles, is 10% or less.

The liquid dispersion is prepared by adding the above-produced CNTs 5 into a solvent. The CNTs 5 in the solvent are dispersed uniformly by application of mechanical energy such as compressive force, shearing force, impulse force, or frictional force. The mechanical energy may be applied, for example, with a stirrer, a ball mill, a jet mill, a homogenizer, an ultrasonic dispersion machine, or the like.

Examples of the solvent include water, alcohols such as ethanol, methanol, and isopropyl alcohol, and organic solvents such as toluene, acetone, tetrahydrofuran (THF), methyl ethyl ketone (MEK), hexane, normal hexane, ethyl ether, xylene, methyl acetate, and ethyl acetate. The liquid dispersion does not contain a dispersing agent, a surfactant, an adhesive, an additive, and the like.

(Adhesion of CNT)

The mechanical energy is applied to the above-prepared liquid dispersion in a manner similar to the above while the fiber 3 is immersed in the liquid dispersion. Thereby the CNTs 5 adhere to the surface of the fiber 3.

The mechanical energy applied to the liquid dispersion causes a state (reversible reaction state) of reversible reaction, in which dispersion and aggregation of the CNTs 5 occur constantly.

When the fiber 3 is immersed in the liquid dispersion in the reversible reaction state, the reversible reaction, in which the CNTs 5 disperse and aggregate in a reversible manner, occurs also on the surface of the fiber 3. The CNTs 5 adhere to the surface of the fiber 3 during transition from the state of dispersion to the state of aggregation.

The Van der Waals force acts between the CNTs 5 when the CNTs 5 aggregate. Due to the Van der Waals force, the CNTs 5 adhere to the surface of the fiber 3. Then, the fiber 3 is taken out of the liquid dispersion and dried. Thereby, the composite material 1 with the CNTs 5 adhered to the surface of the fiber 3 is produced.

(3) Action and Effect

In the present embodiment, since the CNTs 5 adhere to the surface of the fiber 3 without any intervening material, the CNTs 5 are not likely to be peeled off from the surface of the fiber 3 of the composite material 1. Therefore, the composite material 1 exhibits both of the intrinsic functions of the fiber and the functions, such as electrical conductivity, thermal conductivity, and mechanical strength, derived from the CNTs.

2. Second Embodiment

Next, a tow prepreg, which is a reinforced fiber, according to a second embodiment will be described. The tow prepreg includes a composite material bundle and the resin composition covering a surface of the composite material bundle. The composite material bundle is a bundle of the plurality of, for example, several thousands to several ten thousands of composite materials 1.

The tow prepreg according to the present embodiment is prepared as follows: the resin composition is removed from a commercially available tow prepreg (with no CNTs adhered thereto), to obtain a bundle of fibers; the composite material bundle is prepared by allowing the CNTs to adhere to a surface of the bundle of fibers; and the composite material bundle is covered with the resin composition. Hereinafter, each step will be described with reference to FIG. 3.

Figure 3:
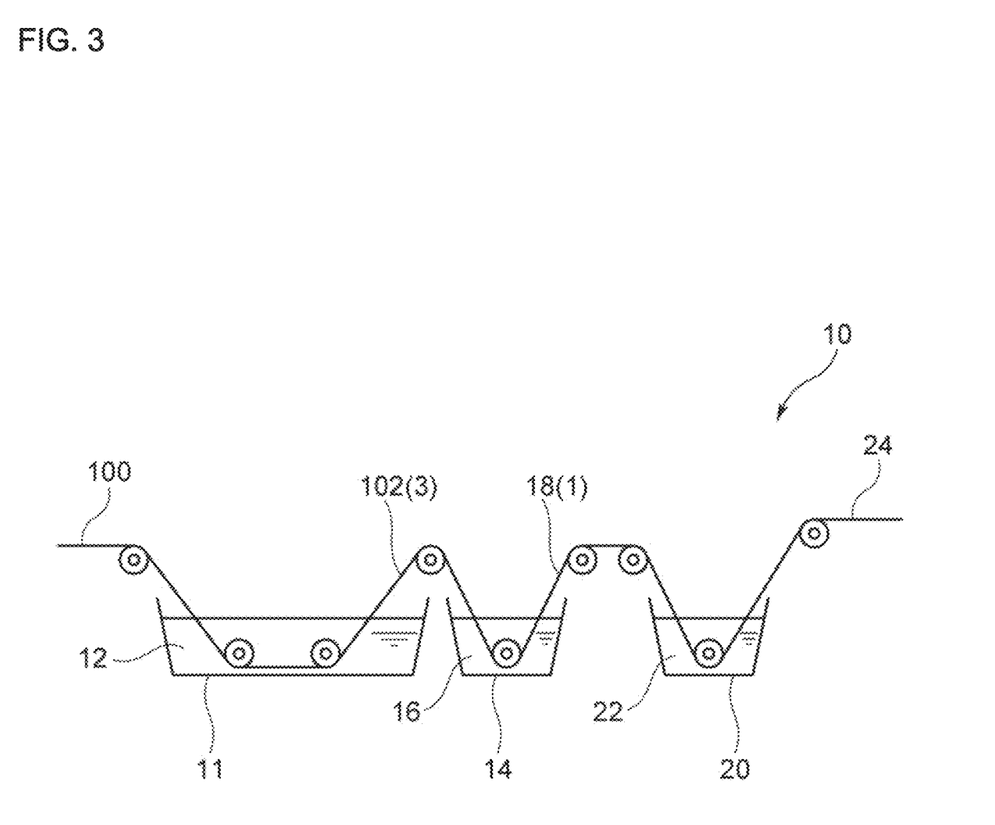
FIG. 3 is a production flow diagram of a reinforced fiber according to a second embodiment.
Figure 4A:
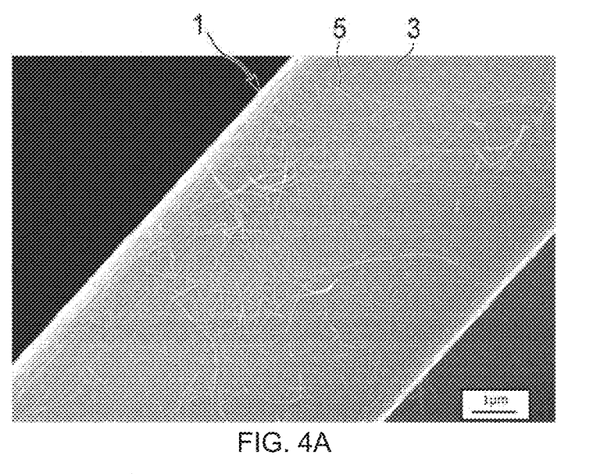
FIG. 4A shows an SEM image of a first site.
Figure 4B:
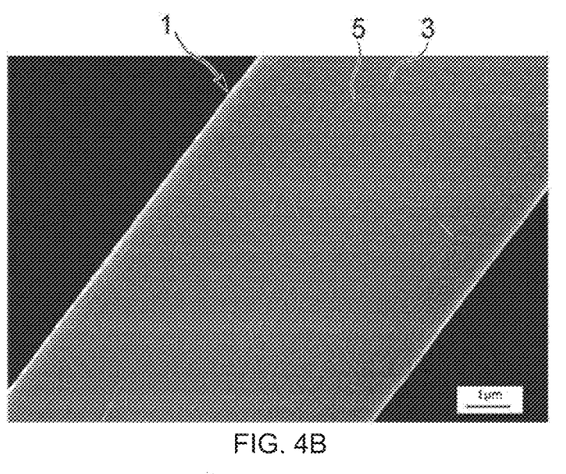
FIG. 4B shows an SEM image of a second site.
Figure 4C:
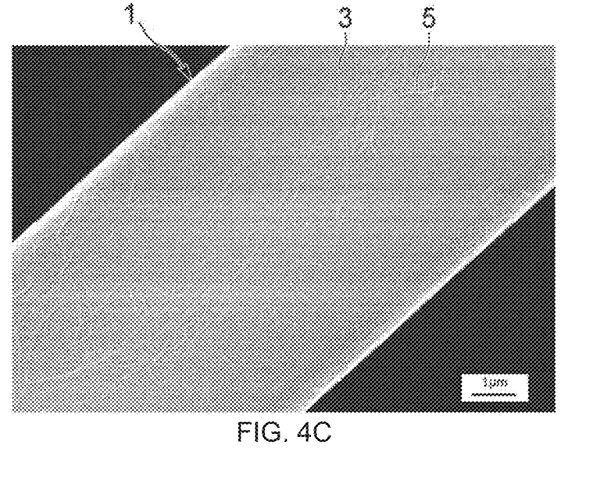
FIG. 4C shows an SEM image of a third site.
Figure 4D:
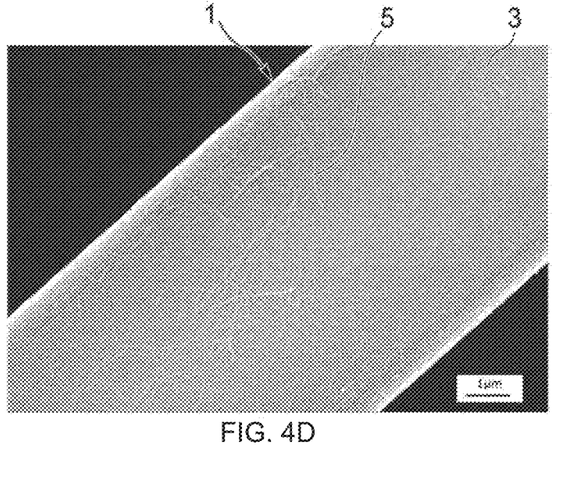
FIG. 4D shows an SEM image of a fourth site.

A tow prepreg production apparatus 10 shown in FIG. 3 includes a resin removal tank 11, a CNT adhesion tank 14, and a resin coating tank 20. The resin removal tank 11 contains an organic solvent such as methyl ethyl ketone as a resin remover 12. The CNT adhesion tank 14 contains the liquid dispersion (a reference numeral 16 in this drawing) described in the above first embodiment. The resin coating tank 20 contains a resin composition 22 melted by heating.

First, a commercially available tow prepreg 100 is wound around a guide roller disposed in the resin removal tank 11. The tow prepreg 100 travels at a predetermined travelling speed. Thereby, the commercially available tow prepreg 100 is immersed in the resin remover 12, so that the resin composition is removed. It is preferred to apply the above-described mechanical energy to the resin remover 12 while the prepreg 100 is immersed therein. The tow prepreg 100 is loosened by the application of the mechanical energy, so that the resin composition is efficiently removed. The resin composition is thus removed to obtain the bundle of fibers (hereinafter referred to as "fiber tow") 102, the surface of which is exposed.

The fiber tow 102 is wound around a guide roller disposed in the CNT adhesion tank 14 and travels in the CNT adhesion tank 14 at a predetermined travelling speed. Thereby, the fiber tow 102 is immersed in the liquid dispersion 16. The CNTs are efficiently adhered to the surface of the fiber by applying the mechanical energy to the liquid dispersion 16 while the fiber tow 102 is immersed in the liquid dispersion 16. Thus, a composite material bundle 18 is obtained.

Next, the composite material bundle 18 is wound around a guide roller disposed in the resin coating tank 20 and travels in the resin coating tank 20 at a predetermined travelling speed. Thereby, the composite material bundle 18 is immersed in the molten resin composition 22. Examples of the resin composition include thermosetting resins such as an epoxy resin, a phenol resin, a melamine resin, a urea resin, an unsaturated polyester resin, an alkyd resin, and a thermosetting polyimide, thermoplastic resins such as polyethylene, polypropylene, polystyrene, an acrylonitrile/styrene resin, an acrylonitrile/butadiene/styrene resin, a methacrylic resin, and vinyl chloride, engineering plastics such as polyamide, polyacetal, polyethylene terephthalate, ultra-high molecular weight polyethylene, and polycarbonate, and super engineering plastics such as polyphenylene sulfide, polyether ether ketone, a liquid crystal polymer, polytetrafluoroethylene, polyetherimide, polyarylate, and polyimide. Thus, a tow prepreg 24 including the composite material bundle 18 and the resin composition is produced. The surface of the composite material bundle 18 is covered with the resin composition.

The CNTs directly adhere to the surface of the fiber of the tow prepreg 24 of the present embodiment. Hence, the same effects as those in the above first embodiment are obtained.

In the tow prepreg 24, the resin composition covers the fiber and the CNTs 5 directly adhered to the surface of the fiber. Therefore the mechanical strength of the tow prepreg 24 is improved by reinforced the resin composition with the CNTs directly adhered to the surface of the fiber.

The present embodiment describes the procedures of producing the composite material bundle 18. The procedures include the procedure of removing the resin composition from the commercially available tow prepreg (with no CNTs) 100 and the procedure of allowing the CNTs to adhere to the surface of the fiber tow 102. The present invention is not limited to this. The step of removing the resin composition is omitted in a case where the fiber is not covered with the resin composition.

The present embodiment describes the reinforced fiber including the composite material bundle in which approximately several thousands to several ten thousands of composite materials are bundled. The present invention is not limited to this. The reinforced fiber may be composed of one composite material.

3. Examples (Sample)

The composite materials according to Examples were prepared by following the procedures of the above-described production method. MW-CNTs (Multi-Walled Carbon Nanotubes) were used as the CNTs. The MW-CNT was grown to the diameter of 10 to 15 nm and the length of 100 μm or more on a silicon substrate by a thermal CVD method. A mixed acid prepared by mixing sulfuric acid and nitric acid at a ratio of 3:1 was used to remove catalyst residues from the CNTs. The CNTs were washed, filtered, and dried.

A tow prepreg (model: T-700, manufactured by Toray Industries, Inc.), which is a bundle (tow) of 12000 carbon fibers each having a diameter of 7 μm, was used. MEK was used as the resin remover. In the liquid dispersion, methyl ethyl ketone was used as the solvent. The concentration of the CNTs 5 in the liquid dispersion was set to 0.01 wt %. A thermosetting epoxy resin was used as the resin composition.

First, the tow prepreg was immersed in the resin remover to remove the resin composition. Thereby the fiber tow is obtained. While being immersed, the tow prepreg travelled at the travelling speed of 1.5 m/min. In addition, the mechanical energy was applied to the resin remover with ultrasonic waves.

Next, the fiber tow was immersed in the liquid dispersion to obtain a composite material bundle with the CNTs adhered to the fibers. While being immersed, the fiber tow travelled at the travelling speed of 1.5 m/min. In addition, the mechanical energy was applied to the liquid dispersion with ultrasonic waves. SEM images of the composite material thus obtained are shown in FIG. 4A to FIG. 4D. FIG. 4A to FIG. 4D show the images of four sites, which are different in the longitudinal direction, on one composite material.

Figure 5:
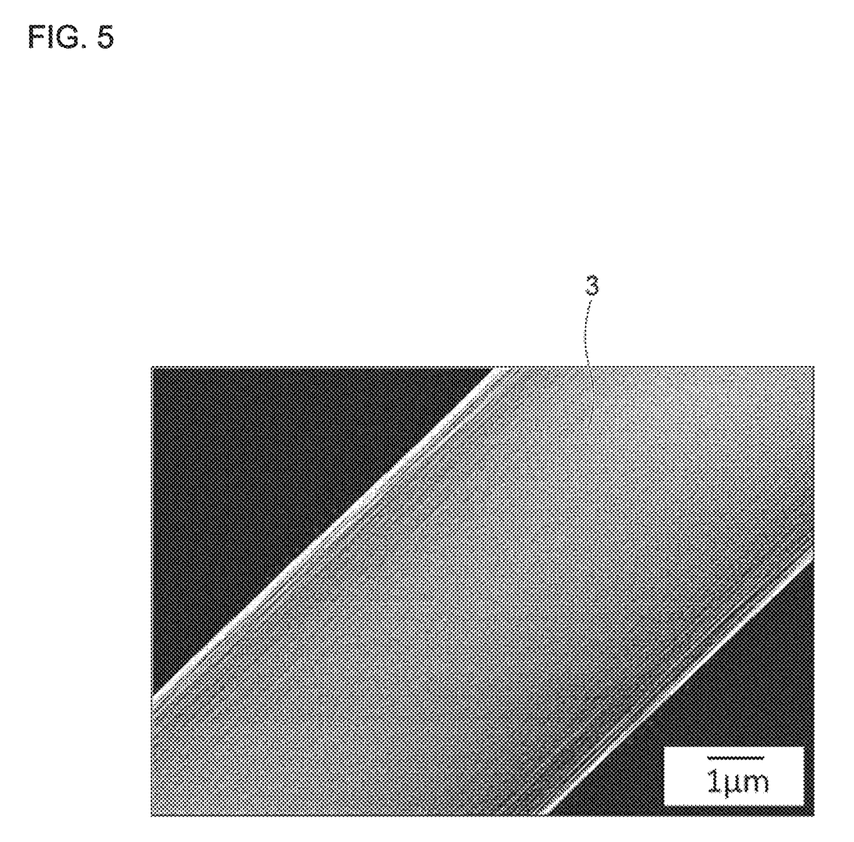
FIG. 5 is an SEM image of a fiber according to Comparative Examples.
Figure 6A:
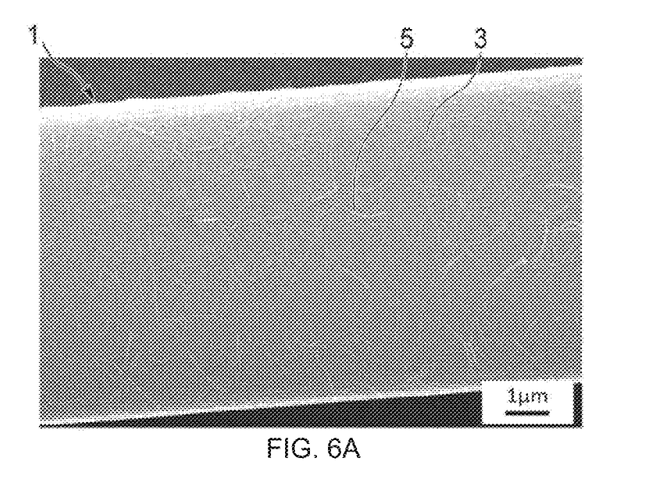
FIG. 6A shows an SEM image of a first site.
Figure 6B:
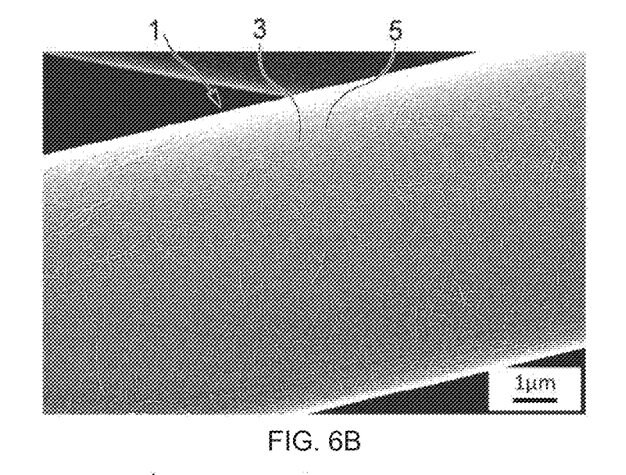
FIG. 6B shows an SEM image of a second site.
Figure 6C:
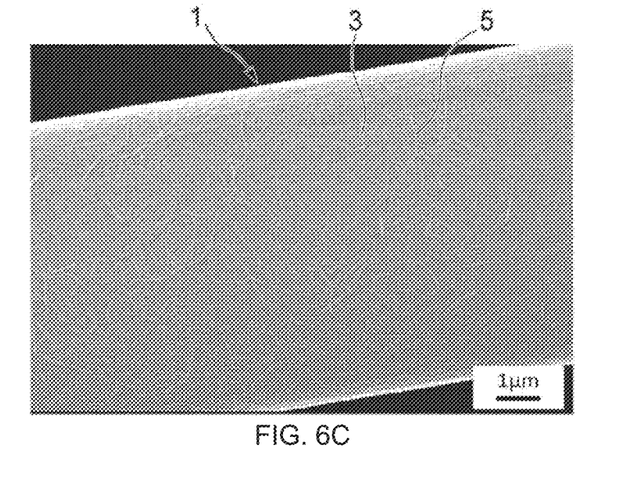
FIG. 6C shows an SEM image of a third site.
Figure 6D:
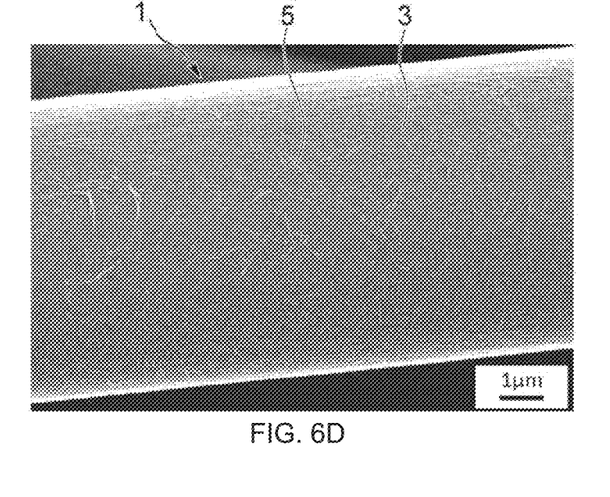
FIG. 6D shows an SEM image of a fourth site.

The composite materials according to the Examples were prepared as described above. In Comparative Examples, the fibers prior to the adhesion of the CNTs were used. FIG. 5 shows a SEM image of the fiber prior to the adhesion of the CNTs.

Apart from the Examples 1 to 10, FIGS. 6A to 6D show SEM images of a composite material, which is prepared in a manner similar to the Examples, with a greater amount of CNTs than those of the Examples 1 to 10. The CNTs of the composite material 1 shown in FIGS. 6A to 6D are entangled with each other, so that the CNTs are directly in contact with each other or directly connected to each other to form a network structure, without any intervening material.

Finally, the fiber tow was immersed in the molten resin composition to produce the tow prepreg. While being immersed, the fiber tow travelled at the travelling speed of 1.5 m/min.

(Evaluation)

The resulting tow prepreg was washed with MEK, and one reinforced fiber was taken out as a sample. Interfacial adhesion strength of the sample was measured. Equipment (HM410, manufactured by Tohei Sangyo Co., Ltd.) for evaluating interfacial property of composite material was used for measuring the interfacial adhesion strength. First, a micro-droplet was prepared with a resin composition in an atmosphere of 80° C. to at least partially surround the sample, and heated under the condition of 125° C.×1 hour. The micro-droplet includes the resin composition, in this case, a thermosetting epoxy resin or a thermoplastic resin (product number: nylon 6 (1013B), manufactured by Ube Industries, Ltd.).

Figure 7:
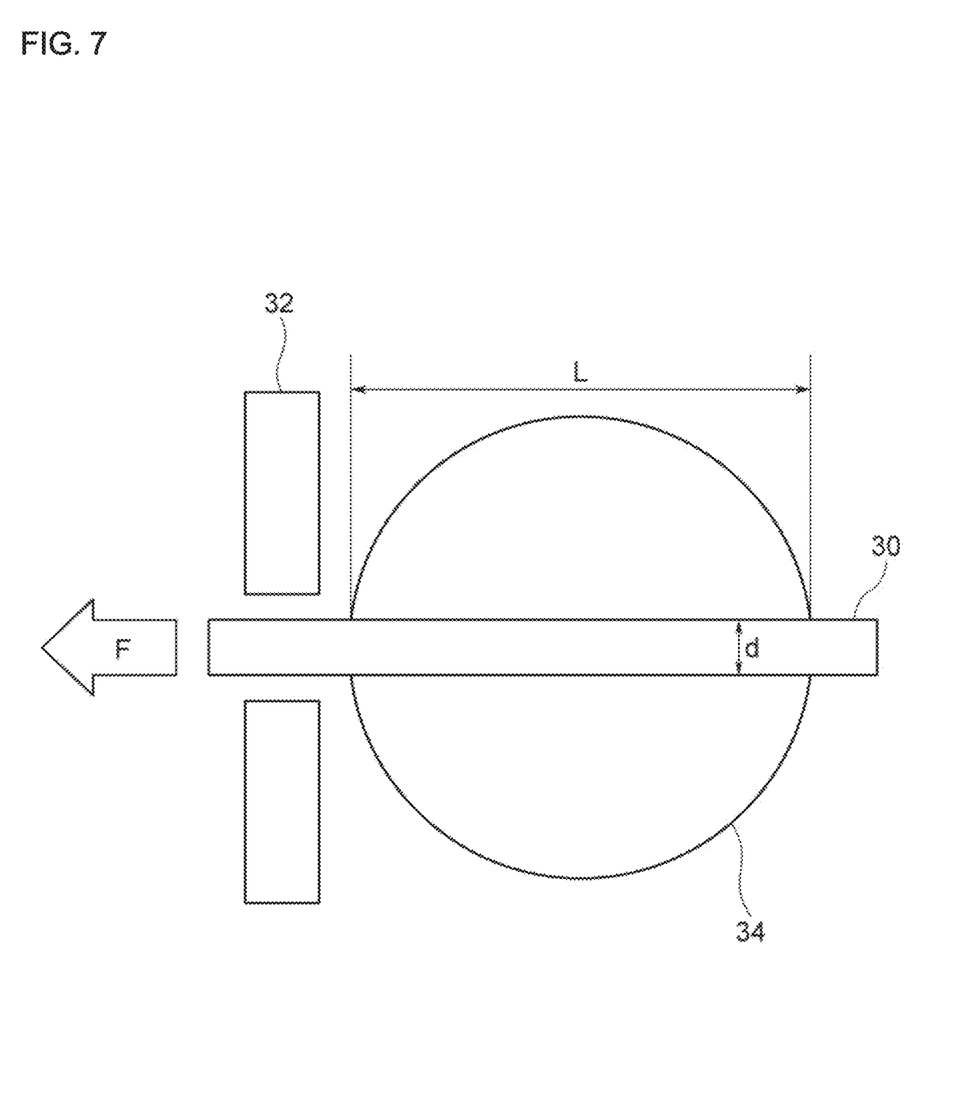
FIG. 7 is a schematic diagram showing a method of measuring interfacial adhesion strength.

A sample 30 was cooled to room temperature and then sandwiched with blades 32, as shown in FIG. 7. Next, the sample 30 was pulled out in the longitudinal direction (arrow direction in the drawing) of the sample 30 at the speed of 0.12 mm/min from a micro-droplet 34. A maximum load F at the time of pulling out the sample 30 was measured with a load cell (not shown). The measurement was performed five times for each sample at room temperature in atmospheric air. Interfacial shear strengths τ were calculated by a following formula (1) to evaluate the interfacial adhesion strengths of Examples and Comparative Examples. In the following formula (1), F represents the maximum load during pulling out; d represents the diameter of the fiber; and L represents the length of the micro-droplet in the direction of pulling out.

$$\tau = F/(d\pi L) \quad (1)$$

The results are shown in Table 1. As shown in the table, it was verified that the average interfacial shear strength of the composite materials according to Examples 1 to 5 was approximately 10% higher than that of the fibers according to the Comparative Examples 1 to 5. The average interfacial shear strength of the composite materials according to the Examples 6 to 10 was approximately 30% higher than that of the fibers according to the Comparative Examples 6 to 10. It is considered that the interfacial shear strengths of the composite materials according to the Examples have been improved because the thermosetting epoxy resin covering the surface of the fiber is reinforced by the CNTs directly adhered to the surface of the fiber.

In each of the Examples 1 to 10, the interfacial shear strength is higher than that of the corresponding Comparative Example. Thus, the interfacial shear strengths of the composite materials according to the Examples are improved regardless of the type of the resin composition used.

Figure 8A:
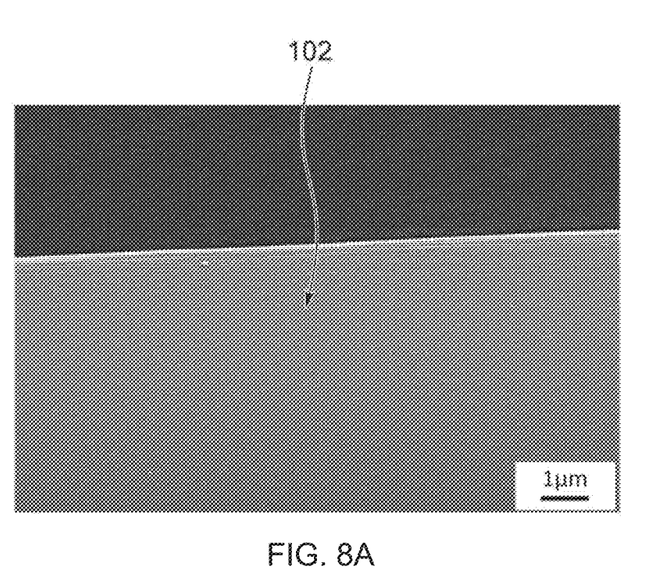
FIG. 8A shows the SEM image of the Comparative Example.
Figure 8B:
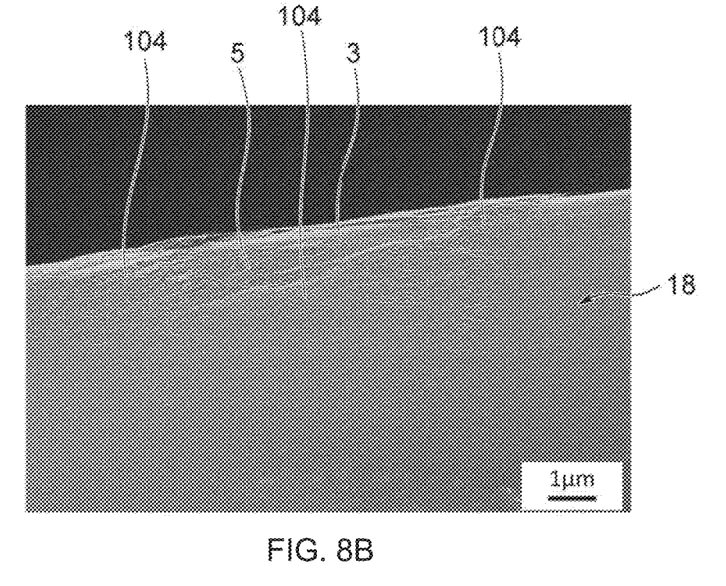
FIG. 8B shows the SEM image of the Example.

FIGS. 8A and 8B are SEM images taken after the evaluations of the interfacial properties of the composite materials. The SEM images respectively show portions of the samples from which the micro-droplets were peeled off. FIG. 8A represents the Comparative Examples 6 to 10. FIG. 8B represents the Examples 6 to 10. As shown in FIG. 8B, the CNTs and the resin composition have been partially peeled off from the surface of the composite materials according to the Examples 6 to 10, so that the surface of the fiber is partially exposed from the surface of the composite material. Thus, in the Examples 6 to 10, the thermoplastic resin organically bonded to the CNTs partially remains on a portion 104 on the surface of the fiber. Based on this fact, it can be said that the CNTs were organically bonded to the micro-droplet, which was formed from the thermoplastic resin and provided on the surface of the fiber, so that the interfacial shear strength was improved.

On the other hand, in the Comparative Examples 6 to 10 represented by FIG. 8A, the micro-droplet, which was formed from the thermoplastic resin and provided on the surface of the fiber, was peeled off at the interface between the fiber and the resin. Hence, it is considered that the micro-droplet formed from the thermoplastic resin was not organically bonded to the fiber. Therefore the interfacial shear strengths were lower than those in the Examples.

TABLE 1

|  |  | Resin composition | Interfacial shear strength (MPa) | Average value (MPa) |
|---|---|---|---|---|
| Examples | 1 | Thermosetting epoxy resin | 80.2 | 81.2 |
|  | 2 | Thermosetting epoxy resin | 85.6 |  |
|  | 3 | Thermosetting epoxy resin | 80.1 |  |
|  | 4 | Thermosetting epoxy resin | 79.8 |  |
|  | 5 | Thermosetting epoxy resin | 80.2 |  |
|  | 6 | Thermoplastic resin | 57.8 | 57.8 |
|  | 7 | Thermoplastic resin | 59.7 |  |
|  | 8 | Thermoplastic resin | 57.4 |  |
|  | 9 | Thermoplastic resin | 56.5 |  |
|  | 10 | Thermoplastic resin | 57.6 |  |
| Comparative Examples | 1 | Thermosetting epoxy resin | 73.4 | 72.9 |
|  | 2 | Thermosetting epoxy resin | 73.7 |  |
|  | 3 | Thermosetting epoxy resin | 73.5 |  |
|  | 4 | Thermosetting epoxy resin | 70.1 |  |
|  | 5 | Thermosetting epoxy resin | 73.8 |  |
|  | 6 | Thermoplastic resin | 47.3 | 44.2 |
|  | 7 | Thermoplastic resin | 46.7 |  |

TABLE 1-continued

| Resin composition | Interfacial shear strength (MPa) | Average value (MPa) |
|---|---|---|
| 8 Thermoplastic resin | 37.2 | |
| 9 Thermoplastic resin | 41.3 | |
| 10 Thermoplastic resin | 48.5 | |

REFERENCE SIGNS LIST

1 Composite material
3 Fiber
5 Carbon nanotube (CNT)
18 Composite material bundle
24 Tow prepreg (reinforced fiber)
102 Fiber tow

The invention claimed is:

1. A method for producing a composite material, the method comprising:

preparing a fiber tow, a surface of the fiber tow being exposed;

preparing a liquid dispersion containing carbon nanotubes;

applying mechanical energy with ultrasonic waves to the liquid dispersion to cause a state of reversible reaction in which dispersion and aggregation of the carbon nanotubes occur constantly;

immersing the fiber tow in the liquid dispersion by winding the fiber tow around a guide roller disposed in a CNT adhesion tank containing the liquid dispersion that is in the state of reversible reaction and traveling the fiber tow in the CNT adhesion tank to allow the carbon nanotubes to adhere to a surface of a fiber of the fiber tow.

* * * * *